Patented July 11, 1950

2,515,164

UNITED STATES PATENT OFFICE 2,515,164

CONDENSATION PRODUCTS FROM VINYL ETHERS

Donald E. Sargent, Easton, Pa., assignor to General Aniline & Film Corporation, New York, N. Y., a corporation of Delaware No Drawing. Application August 9, 1945, Serial No. 609,933

10 Claims. (Cl. 260—47)

The present invention relates to the condensation products of cyclic compounds of aromatic character bearing a substituent group having a reactive hydrogen atom and vinyl ethers and the process of producing the same.

In accordance with the present invention, novel condensation products are obtained by condensing a cyclic compound of aromatic character bearing an inorganic substituent group having a reactive hydrogen atom, such as a hydroxy, amino or mercapto group, with a vinyl ether, preferably in the presence of a small amount of an acid reacting compound as a condensation catalyst. The thus-obtained condensation products are resins whose physical properties can be varied through a relatively wide range by selection of particular reactants from relatively soft soluble resins having a low melting point to hard infusible and insoluble resins.

In practicing the present invention, all cyclic compounds of aromatic character bearing an inorganic substituent group having a reactive hydrogen atom which preferably are unsubstituted in either the two ortho positions or in an ortho and para position with respect to the substituent containing a reactive hydrogen atom, are suitable for use as one of the reactants. As suitable cyclic compounds of aromatic character bearing a substituent group having a reactive hydrogen atom may be mentioned hydroxylated cyclic compounds such as phenolic compounds, for instance, phenol, ortho-, meta- and para-cresol, various xylenol, pseudo-cuminol, carvacrol, thymol and other alkyl phenols, such as primary, secondary and tertiary butyl phenols, the different octyl phenols and the like, also such polyhydroxy phenolic compounds as catechol, resorcinol, orcinol, pyrogallol, phloroglucinol and such polycyclic phenolic compounds as α- or β-naphthol, alkylated naphthols, etc., also partially hydrogenated aromatic phenolic compounds, such as tetrahydronaphthol. In addition to the above, heterocyclic hydroxy compounds, such as hydroxylated pyridine, quinoline and methyl quinoline, and halogenation and sulfonation products of said hydroxylated compounds, such as, for example, chlorinated phenol or naphthol and sulfonic acids of the phenol or naphthol may be used. In addition to the hydroxy aromatic compounds, the corresponding mercapto compounds may be employed, such as thiophenol, thiocresol and thionaphthol. Likewise, the corresponding amino compounds, such as aniline, may be used as the equivalent of the hydroxy aromatic compounds specified above.

The particular cyclic compound of aromatic character bearing an inorganic substituent group having a reactive hydrogen atom, which is employed, exerts considerable influence on the properties of the condensation product which is produced. For the production of resins having a relatively low softening point, it is preferable to employ a cyclic compound which in either its ortho- or para-position, with respect to the substituent group having a reactive hydrogen atom, is substituted by a relatively unreactive group. Thus, the ortho and para alkyl-phenols are particularly valuable for the production of soluble, fusible resins. Such substituted phenols appear to yield condensation products having a straight chain structure. On the other hand, when both the ortho positions and also the para position with respect to the substituent having a reactive hydrogen atom are open, the resins which are produced under otherwise identical conditions are relatively insoluble and infusible, it being possible to produce practically completely insoluble and infusible resins with this type of reactant. It appears that there is considerable cross-linkage in the structure of these resins. Likewise, the particular cyclic compound employed exerts considerable influence on the speed of the reaction. In the case of cyclic compounds containing several substituents having reactive hydrogen groups, as is the case with resorcinol, so that some of the open positions are activated by more than one hydroxyl or similar group, the condensation action proceeds extremely rapidly. Thus, in condensing resorcinol with methyl vinyl ether, the condensation proceeds with almost explosive violence and a resin is obtained which gives evidence of extensive cross-linkage in its structure which is much more difficultly soluble than the products obtained from monohydroxy phenols.

The other reactant employed in accordance with the present invention is an ethylenically unsaturated ether of the formula:

in which R stands for an alkyl, aryl or aralkyl group and $R^1$, $R^2$ and $R^3$ stand for hydrogen or an alkyl, aryl or aralkyl group. As examples of such ethylenically unsaturated ethers in which $R^1$, $R^2$ and $R^3$ stand for hydrogen, may be mentioned the vinyl ethers, such as the lower alkyl vinyl ethers, for instance, methyl, ethyl, propyl, isopropyl, butyl, isobutyl, secondary butyl and cyclohexyl vinyl ethers or the higher alkyl vinyl ethers, such as lauryl, oleyl and octadecyl vinyl ethers; also aralkyl vinyl ethers, such as, benzyl vinyl ether and the vinyl ethers of other aromatic carbinols; likewise, the vinyl ethers of phenolic compounds, such as phenyl, alkylphenyl and α- or β-naphthyl-vinyl ethers. As examples of ethylenically unsaturated vinyl ethers in which one or more of the groups $R^1$, $R^2$ or $R^3$ is an alkyl, aryl or aralkyl group may be mentioned the ethers of such alkyl-vinyl alcohols as propenyl, ispropenyl or butenyl alcohol, for instance, the methyl, ethyl, propyl, cyclohexyl, benzyl or phenyl ethers of these alcohols. As examples of ethers of aryl vinyl alcohols may be mentioned the ether of hydroxy styrene and ethers like α-phenyl vinyl ether, which may be produced from the enol form of acetophenone.

The particular vinyl ether employed in the condensation may exert considerable influence on the properties of the final resin obtained. The particular vinyl group present in the ether does exert considerable influence on the properties of the final resin. In general, the presence of substituent groups on the vinyl portion of the ether tends to favor the formation of softer and more soluble resins. However, in the case of alkyl vinyl ethers, i. e., methyl vinyl ether, the alkyl group present in the ether is without chemical significance on the properties of the final resin. However, in the case of higher alkyl vinyl ethers, i. e., octadecyl vinyl ether, the alkyl group may be split off as an alcohol during the condensation and due to its high boiling point may remain in the condensation product and thus act as a modifying agent. A somewhat different situation applies with respect to the aryl vinyl ethers, for instance, phenyl or α- or β-naphthyl-vinyl ether. In this case, the aryl portion of the ether appears to enter into the reaction and to be chemically combined in the structure of the final resin. This fact may be taken advantage of when it is desired to have present in the final resin several types of aromatic nuclei since the aryl portion of the vinyl ether may, if desired, be different from the aryl compound employed as the other reactant.

In practicing the present invention, the cyclic compound of aromatic character and the vinyl ether may advantageously be reacted in substantially equimolar proportions. In the case of cyclic compounds having only two open positions, either ortho or para to the substituent containing a reactive hydrogen group, one mole of vinyl ether to each mole of cyclic compound is theoretically necessary in order to insure complete reaction. In case the cyclic compound employed has three or more open positions which are ortho or para to substituents containing an active hydrogen atom, the amount of vinyl ether employed may be further increased and, in general, results in the formation of somewhat more insoluble and infusible resins than is otherwise the case.

It has been found that acid reacting compounds generally are effective as a condensation catalyst for the present reaction and, in fact, many phenolic compounds possess sufficient acidic character for the reaction to proceed without the use of a catalyst. However, in case the aromatic compound employed as the reactant is not acid in character, or only slightly so, the reaction may be initiated by such acid reacting condensation catalysts as organic or inorganic acids, for instance, acetic acid, hydrochloric, sulfuric, phosphoric, aromatic sulfonic acids; i. e., p-toluene sulfonic acid, or other acids; organic or inorganic acid salts, such as the salt of a strong acid and weak base, for example, aluminum, zinc, or iron sulfate, and other acid reacting salts, such as sodium or potassium bisulfate, and the so-called Friedel-Crafts type of catalyst, for instance, aluminum or zinc chloride or sulfate, stannous chloride, boron fluoride, tin or silicon tetrachloride, and the like, and other known acidic condensation catalysts, such as acid clays.

The reaction is exothermic and may be carried out through a relatively wide range of temperature, depending on the particular reactants and on the particular product desired. In general, it is preferable to slightly warm the reaction mixture in order to initiate the reaction. Once the reaction has been started, sufficient heat is generally generated so that additional heating is unnecessary unless it is desired to distill off a product or by-product of the reaction, in which case sufficient heat to insure vaporization of the desired components may be added. Thus, when condensing para-tertiary butyl phenol with methyl vinyl ether, methanol is split off as a by-product of the reaction and may advantageously be distilled off during the reaction. While the reaction generates sufficient heat so that it proceeds rapidly, additional heat must be supplied if it is desired to distill off the methanol. The particular temperature at which any specific condensation is to be carried out may readily be determined by simple preliminary tests and a number of specific examples of preferred temperatures are given in the accompanying specific examples. The optimum temperature for any reactants or specific resin also varies with the particular reactants employed. Thus, as indicated previously, in the case of cyclic compounds containing several inorganic substituents having reactive hydrogen groups, such as resorcinol, the reaction proceeds extremely rapidly even at relatively low temperatures, while in the case of compounds such as ortho or para-alkyl phenols, a slightly elevated temperature is preferable in order to obtain a satisfactory rate of reaction. In general, it may be said that temperatures of from 0° C. to 300° C. are operative, but temperatures of from slightly above room temperature, say 25° C., to 200° C. are preferred.

The present reaction may advantageously be carried out at atmospheric pressure or, if desired, at elevated pressures. The particular pressure employed will generally be selected so that at least one of the reactants is a liquid or solid at the reaction temperature.

In the event that one of the reactants is a solid at the temperature of the reaction, it may be advantageous to carry out the reaction in the presence of solvents, such as hydrocarbons of the aliphatic, aromatic or hydroaromatic series, such as naphtha, gasoline fractions, benzene, toluene, naphthalene and the like; and ketones, such as acetone, methyl ethyl ketone or cyclohexone. It should also be understood that substances desired in the final product which form liquid or solid solutions with the initial materials and/or the condensation products or serve as fillers, may also be added to the reaction mixture. Such substances are, for example, waxes, fatty oils, fats, resins, resin esters and gums, asbestos, talc, chalk, gypsum, cellulose and cellulose esters or ethers and like fillers.

The condensation products obtainable in the above manner may be employed either directly or after previous purification in the so-called "plastic arts," for example, in the preparation of lacquers, varnishes, and insulating agents. As stated, the condensation products having a wide range of physical properties may be produced in accordance with the present invention. In general, the products are quite similar to the resins obtained when reacting an aldehyde with a phenol corresponding to that employed in the present intion.

The condensation products produced in accordance with the present invention may also be further treated in order to modify their properties. Thus, they may be esterified, either partially or completely with organic saturated or unsaturated low or high molecular weight acids, such as fatty acids, aromatic acids, hydroxy acids, ether acids and the like, as for example, diglycollic acid, amino acids or polybasic acids, as for example, phthalic acid, succinic acid, adipic acid, suberic acid, citric acid or tartaric acid, or mixtures of the same. The condensation products may also be sulfonated (products having the properties of tanning agents or ion exchanging compounds thus being obtainable), or they may be nitrated, chlorinated, coupled with diazo compounds or converted into the corresponding glycol ethers by treatment with ethylene oxide. For causing the phenol groups to react, the alkali salts of the phenol resins may be employed. These salts may be brought into reaction with halogen compounds, such as methyl iodide, chlorohydrins, chloracetic acid or acid chlorides, or with dimethyl or diethyl sulfate.

The present invention will be fully understood by those skilled in the art from a consideration of the following specific examples.

Example 1

75 parts of p-tertiary butyl phenol was suspended in 200 parts of benzene containing a minor amount, 0.75 part, of p-toluene sulfonic acid. This mixture was heated, while stirring at 35° C. until the p-tertiary butyl phenol was dissolved. The heating was then discontinued and methyl vinyl ether was charged into the solution as a gas with stirring, at such a rate that the temperature did not exceed 40° C. and, in general, was held at 35° C. and 40° C. by slight external cooling. The addition of methyl vinyl ether was continued in this manner for a period of about 1 hour, during which time approximately 29 parts of the methyl vinyl ether were added. 1 part of triethanolamine was then added as a stabilizer and the reaction mass was subjected to distillation at atmospheric pressure to remove the benzene and any by-products, principally methanol, or the reaction. When the temperature of the distillation vessel had reached 230° C., the undistilled residue was discharged into an externally cooled pan. This product quickly solidified and was broken out of the pan when cooled. The material so obtained was a brittle, light yellow resin soluble in acetone and benzene in a yield of 72.3 parts, having a softening point of 137 flow and 144 drop by the Ubbelohde method, described at page 45, D. Holde-Kohlenwasserstoffole und Fette. This product is useful as a tackifier for synthetic rubber and for various other purposes where materials of this nature are employed.

The above experiment was repeated under the same conditions except that methyl vinyl ether was added to the phenol catalyst solution for a period of 70 minutes until approximately 34.8 parts of methyl vinyl ether had been added. The yield in this case amounted to 84.5 parts of resin which was slightly darker in color than that which was obtained in the preceding experiment.

The experiment was again repeated under otherwise identical conditions except that methyl vinyl ether was added to the phenol catalyst solution over a period of approximately 81 minutes until approximately 40.6 parts of methyl vinyl ether had been added. The yield in this case was 75 parts of a resin which was brownish-yellow in color.

The experiment was again repeated under otherwise identical conditions except that 46 parts of methyl vinyl ether were added to the phenol catalyst solution over a period of approximately 92 minutes. The yield obtained in this case amounted to 85.4 parts of resin having a dark brownish-yellow color.

The experiment was again repeated under otherwise identical conditions except that 52.2 parts of methyl vinyl ether were added to the phenol catalyst solution over a period of approximately 105 minutes. The yield in this case amounted to 83.5 parts of resin having a reddish-brown color.

The experiment was again repeated under otherwise identical conditions except that 58 parts of methyl vinyl ether were added to the phenol-catalyst solution over a period of approximately 116 minutes. The yield in this case amounted to 82.2 parts of resin having a dark brown color.

It will be understood that other lower alkyl vinyl ethers are the equivalent of methyl vinyl ether specified in the preceding paragraphs of this example and equivalent amounts of such vinyl ethers as ethyl vinyl ether, propyl, isopropyl, normal and secondary butyl vinyl ether, may be substituted for the methyl vinyl ether specified above without substantially altering the conditions of reaction. However, in the case of alkyl vinyl ethers which boil above the temperature of the reaction specified in this example, it may be desirable to employ sufficiently elevated temperature so as to assure their being in vapor phase during the reaction, since, in general, the reaction proceeds somewhat more rapidly when the vinyl ether is in vapor phase. As an example of the substitution of other alkyl vinyl ethers for methyl vinyl ether specified above, the experiment described in the paragraph immediately preceding was again repeated under otherwise identical conditions, except that 72 parts of ethyl vinyl ether were added to the phenol-catalyst solution over a period of approximately 120 minutes. The yield in this case amounted to 80 parts of resin having a dark brown color, and ethyl alcohol was obtained as a by-product.

Example 2

A mixture of 75 parts of p-tertiary butyl phenol and 0.1 part of p-toluene sulfonic acid was placed in a reaction vessel and the phenol and p-toluene sulfonic acid were then fused together with stirring at 110° C. Methyl vinyl ether was then added as a gas under the surface of the fused mixture while it was stirred vigorously. At the beginning of the reaction, the phenol sublimed heavily to the upper part of the reaction vessel but was washed back into the reaction mass by refluxing the volatile by-products of the reaction. The addition of methyl vinyl ether was continued until approximately 27.3 parts thereof had been added. During the addition of the methyl vinyl ether, the temperature of the reaction mixture was maintained at 98–110° C. On completion of the addition of the methyl vinyl ether, the hot reaction mixture was transferred to a distillation vessel and volatile by-products of the reaction were removed by heating to 220° C. at 15 mm. pressure. The molten resin remaining on completion of the distillation was then poured into a pan to cool. Approximately 71.3 parts of reddish-brown semi-transparent brittle resin were obtained.

Example 3

A mixture of 75 parts of p-tert.-butylphenyl and 0.75 part p-toluene sulfonic acid (catalyst) were fused together with stirring at 110° C. in a reaction vessel. Methyl vinyl ether was then admitted as a gas under the surface of the melt while it was vigorously stirred. As the methyl vinyl ether was added, the melt became darker and volatile materials distilled out of the reaction vessel. As the reaction continued, the fused mass became more viscous and it was necessary to raise the temperature in order to obtain good stirring and gas absorption. By the time a weight increase of 13 parts in the reaction mixture had been obtained, the temperature had been raised to 180° C. The addition of the vinyl ether was then stopped and the contents of the vessel were stirred for 20 minutes at 220° C. in order to remove any remaining volatile material and the molten resin was discharged into a pan and chilled. The product was a dark, reddish-brown, brittle resin amounting to 74.6 parts. This product is very useful as a tackifier in synthetic rubber.

Example 4

A mixture of 50 parts of resorcinol (1,3-dihydroxy benzene) and 9.5 parts p-toluene sulfonic acid (catalyst) were fused together with stirring at 110° C. Then 90.8 parts of n-butyl vinyl ether were added as a liquid, portionwise, to the stirred melt at such a rate that the reaction temperature was maintained at 110–120° C. The reaction was very vigorous and exothermic. The product came out of the solution as a tough, spongy mass almost immediately upon the addition of each portion of the vinyl ether and had to be broken up by stirring before more vinyl ether was added. As the reaction progressed, the color of the reaction mixture and the product changed from almost colorless to dark brown. After all the vinyl ether had been added, the reaction mass was heated to 120° C. to complete the reaction. The spongy, dark brown product was then washed well in methanol in a high-speed mixer (which exerted a strong shearing and pulverizing action on the product) and was filtered off and dried. A yield of 64.4 parts of methanol insoluble resin was obtained, which had a softening point in excess of 180° C. and was insoluble in methanol and acetone but soluble on prolonged warming in aromatic hydrocarbons, such as xylene.

Example 5

A mixture of 54 parts of p-cresol and 0.45 part of p-toluene sulfonic acid (catalyst) were melted together with stirring at 40° C. Methyl vinyl ether was then admitted under the surface of the melt while it was vigorously stirred. An exothermic reaction set in, and the temperature gradually rose to 120° C. With the methyl vinyl ether still being admitted, the temperature was gradually raised to 160–170° C. by the application of external heat, in order to distill off the volatile by-products of the reaction as they formed. The addition of the methyl vinyl ether was continued until a weight increase of 13.1 parts in the reaction mixture was obtained. After all the vinyl ether had been added the reaction mixture was stirred at 200° C. for 20 minutes to complete the reaction and to remove any remaining volatile materials. The fused resin was then poured into a chilled pan to solidify. The product was a dark-brown, brittle resin amounting to 65.1 parts, having a Ubbelohde softening point of 110° C. flow and 120° C. drop.

Example 6

A mixture of 1000 parts p-tert.-butylphenol and 10 parts of p-toluene sulfonic acid (catalyst) were mixed together and then fused with stirring at 110° C. Methyl vinyl ether was then added under the surface of the fused mass as a gas while the latter was vigorously stirred. As the ether was admitted, the temperature gradually rose from 110° C. to 140° C., and the phenol, which had previously sublimed to the upper part of the reaction vessel, was washed down by the reflux of the volatile by-products of the reaction. The temperature was then raised to 210° C. and methyl vinyl ether was added at a rate of 1 to 2 parts per minute. The volatile reaction products were then allowed to constantly distill out of the vessel while the methyl vinyl ether was added. As the reaction progressed, the phenol mixture became darker in color (brown) and more viscous, and took on a resinous nature. The vinyl ether addition was continued until volatile materials no longer distilled out of the reaction mixture, and tests showed that very little unreacted p-tert.-butyphenol was present. The molten resinous product was vigorously stirred at 200° C. for 20 minutes longer in order to complete the reaction and remove any remaining volatile material. After this, it was poured into a chilled vessel, solidified, and pulverized. The product was a dark brown, brittle resin which amounted to approximately 1083 parts. This material softened at 110° C. and became partly fluid at 130–140° C. Tests in synthetic rubber compositions showed it to be an excellent tackifier.

Example 7

A mixture of 72 parts of α-naphthol and 0.72 part of p-toluene sulfonic acid (catalyst) were fused together with stirring at 110° C. Methyl vinyl ether was then admitted under the surface of the melt, and the temperature was gradually raised to 190° C. The reaction mixture was stirred constantly while the methyl vinyl ether was added. Almost as soon as the ether was admitted volatile material began distilling out of the reaction mixture, approximately 18.2 parts of distillate being collected. The methyl vinyl ether was added until a weight increase of 10 parts was obtained in the reaction mixture, and the latter was then poured out while still hot into a pan to solidify. Approximately 82 parts of a dark purplish-black, brittle resin was obtained in this manner, having a Ubbelohde softening point of 75° C. flow and 90° C. drop.

Example 8

A mixture of 85.1 parts of o-hydroxydiphenyl and 0.85 part of p-toluene sulfonic acid (catalyst) were fused together with stirring at 60° C. A stream of methyl vinyl ether (gas) was then admitted under the surface of the stirred melt at a rate of approximately 0.5 part per minute. Almost as soon as the vinyl ether was admitted the colorless melt became darker and as the reaction progressed the mixture became a dark, reddish-brown. After the addition of the vinyl ether was started, the temperature of the reaction mixture was raised over a period of 15 minutes to 190° C. and the temperature was kept at 190-200° C. for the remainder of the reaction period. The vinyl ether was added until a weight increase of approximately 12.5 parts in the reaction mixture had been obtained. During this time a total of 18.5 parts of distillate were collected. After the vinyl ether had been added the reaction mixture was heated to 240° C. for 5 minutes in order to remove any residual volatile materials. The molten resin was then chilled to 200° C., poured into a pan cooled externally with ice. The resin quickly solidified to a reddish-brown, hard, brittle mass which was broken out of the pan and taken as the product. Approximately 97.5 parts of an acetone-soluble resin were obtained in this way (99% of the theoretical amount).

*Example 9*

A mixture of 80 parts of naphthalene-2-thiol (containing some hydrocarbon wax; Du Pont RPA-3) and 0.8 part p-toluene sulfonic acid (catalyst) were fused with stirring at 100° C. Methyl vinyl ether was then admitted as a gas under the surface of the melt while it was rapidly stirred, and the temperature was gradually raised to 200° C. During a period of 1 hour, a weight increase of 7 parts in the reaction mixture was obtained and distillate amounting to 7.3 parts was collected. The product was an inhomogeneous, dark-brown melt which separated on cooling to a light-brown waxy material and a dark-brown resinous material. The yield was 87 parts.

I claim:

1. The process of producing resinous products, which comprises reacting in the presence of catalytic amounts of an acid-reacting condensation agent and at a temperature of from 25° C. to 200° C., and in a molar ratio of from 1 to 2:1, a vinyl compound consisting of a vinyl ether of the formula:

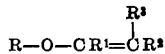

wherein R stands for a member of the group consisting of alkyl, aryl and aralkyl groups, and $R^1$, $R^2$ and $R^3$ stand for a member of the group consisting of hydrogen, alkyl, aryl and aralkyl groups, with a monomeric aryl compound having a nuclear substituent containing an active hydrogen atom and selected from the group consisting of hydroxyl, amino and mercapto radicals, and which is unsubstituted in at least two of the positions ortho- and para- to said substituent containing an active hydrogen atom.

2. The process of producing resinous products, which comprises reacting in the presence of catalytic amounts of an acid-reacting condensation agent and at a temperature of from 25° C. to 200° C., and in a molar ratio of from 1 to 2:1, a vinyl compound consisting of a lower alkyl vinyl ether with a monomeric aryl compound having a nuclear substituent containing an active hydrogen atom and selected from the group consisting of hydroxyl, amino and mercapto radicals, and which is unsubstituted in at least two of the positions ortho- and para- to said substituent containing an active hydrogen atom.

3. The process of producing resinous products, which comprises reacting in the presence of catalytic amounts of an acid-reacting condensation agent and at a temperature of from 25° C. to 200°., and in a molar ratio of from 1 to 2:1, a vinyl compound consisting of a vinyl ether of the formula:

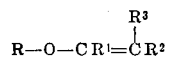

wherein R stands for a member of the group consisting of alkyl, aryl and aralkyl groups, and $R^1$, $R^2$ and $R^3$ stand for a member of the group consisting of hydrogen, alkyl, aryl and aralkyl groups, with a monomeric phenol which is unsubstituted in at least two of the positions ortho- and para- to the hydroxyl group and which is otherwise free of substituents other than hydrocarbon substituents.

4. The process of producing resinous products, which comprises reacting in the pressure of catalytic amounts of an acid-reacting condensation agent and at a temperature of from 25° C. to 200° C., and in a molar ratio of from 1 to 2:1, a vinyl compound consisting of a lower alkyl vinyl ether with a monomeric phenol which is unsubstituted in at least two of the positions ortho- and para- to the hydroxyl group and which is otherwise free of substituents other than hydrocarbon substituents.

5. The process of producing resinous products, which comprises reacting in the presence of catalytic amounts of an acid-reacting condensation agent and at a temperature of from 25° C. to 200° C., and in a molar ratio of from 1 to 2:1, a vinyl compound consisting of a lower alkyl vinyl ether with a monomeric phenol having an alkyl substituent in one of the positions ortho- and para- to the hydroxyl group, and which is unsubstituted in two of the positions ortho- and para- to the hydroxyl group, and which is otherwise free of substituents other than hydrocarbon substituents.

6. The process of producing resinous products, which comprises reacting in the presence of catalytic amounts of an acid-reacting condensation agent and at a temperature of from 25° C. to 200° C., and in a molar ratio of from 1 to 2:1, a vinyl compound consisting of a lower alkyl vinyl ether with p-tertiary butylphenol.

7. The process of producing resinous products, which comprises reacting in the presence of catalytic amounts of an acid-reacting condensation agent and at a temperature of from 25° C. to 200° C., and in a molar ratio of from 1 to 2:1, a vinyl compound consisting of methyl vinyl ether with p-tertiary butylphenol.

8. Resinous products obtained by the process defined in claim 1.

9. Resinous products obtained by the process defined in claim 4.

10. Resinous products obtained by the process defined in claim 7.

DONALD E. SARGENT.

REFERENCES CITED

The following references are of record in the file of this patent:

UNITED STATES PATENTS

| Number | Name | Date |
|---|---|---|
| 2,157,347 | Reppe et al. | May 9, 1939 |
| 2,307,885 | Gleason | Jan. 12, 1943 |
| 2,351,108 | Collins | June 13, 1944 |
| 2,380,426 | Fryling | July 31, 1945 |

FOREIGN PATENTS

| Number | Country | Date |
|---|---|---|
| 414,699 | Great Britain | Aug. 7, 1934 |